United States Patent
Kato et al.

(10) Patent No.: US 6,881,485 B2
(45) Date of Patent: Apr. 19, 2005

(54) TEMPERED GLASS SHEET AND METHOD THEREFOR

(75) Inventors: Yasumasa Kato, Kanagawa (JP); Kazushige Yoda, Aichi (JP)

(73) Assignee: Asahi Glass Company, Limited, Tokyo (JP)

(*) Notice: Subject to any disclaimer, the term of this patent is extended or adjusted under 35 U.S.C. 154(b) by 445 days.

(21) Appl. No.: 10/132,472

(22) Filed: Apr. 26, 2002

(65) Prior Publication Data

US 2002/0194872 A1 Dec. 26, 2002

(30) Foreign Application Priority Data

Apr. 27, 2001 (JP) ........................................ 2001-133719

(51) Int. Cl.[7] .................................................. B32B 9/00
(52) U.S. Cl. ....................... 428/410; 428/409; 428/426; 65/114; 65/348
(58) Field of Search ................................ 428/409, 410, 428/426; 65/114, 348, 349

(56) References Cited

U.S. PATENT DOCUMENTS

| 3,125,430 A | 3/1964 | Richardson |
| 6,180,237 B1 | 1/2001 | Kato et al. |

FOREIGN PATENT DOCUMENTS

| GB | 886871 | 1/1962 |
| JP | 52-121620 | 10/1977 |
| JP | 58-091042 | 5/1983 |
| JP | 59-019050 | 5/1984 |
| JP | 2000-103632 | 4/2000 |

OTHER PUBLICATIONS

Patent Abstracts of Japan, JP 55–104935, Aug. 11, 1980.
Patent Abstracts of Japan, JP 11–199257, Jul. 27, 1999.
Patent Abstracts of Japan, JP 58–091042, May 30, 1983.

*Primary Examiner*—Jennifer McNeil
*Assistant Examiner*—G. Blackwell-Rudasill
(74) *Attorney, Agent, or Firm*—Oblon, Spivak, McClelland, Maier & Neustadt, P.C.

(57) ABSTRACT

There is provided a tempered glass sheet, which is air-cooled and tempered by a cooling medium blown from a plurality of nozzles provided in rows so as to have a stress pattern formed therein, comprising a stress pattern formed in the glass sheet such that a plurality of cells range to form the stress pattern, the respective cells have centers just under the respective nozzles; each of the cells having a central region with a membrane stress in a compression state; each of the cells having a peripheral region with a membrane stress in a compression state; and each of the cells having a region between the central region and the peripheral region with a membrane stress in a tension state. There is also provided a method for producing the tempered glass sheet.

16 Claims, 5 Drawing Sheets

TEMPERED GLASS SHEET AND METHOD THEREFOR

The present invention relates to a tempered glass sheet and a method therefor.

The size, the number and other factors of fragments at the moment of fragmentation of a tempered glass sheet utilized as an automobile windowpane have been prescribed in regulations. For example, Japanese Industrial Standard (JIS) prescribes that the number of glass sheet fragments in an area of 5 cm×5 cm should be not less than 40 and not higher than 400, that no elongated fragments having a length longer than 75 mm should be produced, and that no larger fragments having an area greater than 3 cm$^2$ should be produced. The standards for these sorts of fragment state are prescribed for the purpose of assuring the safety of an automobile passenger at the moment of fragmentation of a glass sheet.

When that sort of glass sheet is commercially produced, there has been generally used a so-called thermally tempering method wherein a glass sheet, which has been heated to a temperature near to the softening point, is quenched by blowing a cooling medium, such as air, to the glass sheet, and changes in the temperature distribution with lapse of time in a thickness direction and generation of a thermal stress, which are caused by the quenching, are utilized to form a compressive stress on the surface of the glass sheet and a tensile stress in the glass sheet. The compressive stress on the surface of the thermally tempered glass sheet contributes to improvement in the strength of the glass sheet, and the tensile stress in the glass sheet contributes to an increase in the fragment density at the moment of fragmentation.

In the production technique stated earlier, as the thickness of a glass sheet becomes thinner, it becomes more difficult to form a temperature distribution in the thickness direction, with the result that the tensile stress in the glass sheet becomes smaller. In the case of a thin automobile windowpane suited for weight reduction in the vehicle, in particular in the case of a thin glass sheet having a thickness of not greater than 3 mm, it is required that the glass sheet be quenched more intensely than before in order to form a tensile stress in the glass sheet to such extent that the regulations demanded on fragment are satisfied. In order to realize that sort of intensive quenching, it is proposed to increase the speed of the cooling medium to be blown to the glass sheet. However, in the case of blowing air to carry out the quenching, this proposal requires a drastic modification in an air supply facility since the intensity of the quenching is proportional to about the ⅓ power of the blown air pressure. Additionally, driving that large-sized air supply facility creates a problem of needing much energy.

On the other hand, there have been proposed methods wherein even a blown air pressure having substantially the same intensity as the prior art can obtain the fragment state of a thin glass sheet satisfying the regulations by utilizing a stress pattern intentionally formed in a surface direction of a glass sheet to control the propagation direction of cracks at the moment of fragmentation of the glass sheet (JP-A-52-121620, JP-A-58-91042 and JP-B-59-19050). The methods are ones that utilize the characteristics wherein when a thermally tempered glass sheet with a tensile stress formed therein is fragmented, a region with the tensile stress formed in a surface direction has cracks propagating so as to develop perpendicularly with respect to the direction of a membrane stress.

The phrase "membrane stress" means a membrane stress that is measured by a photoelastic method, and this means a value that is obtained by integrating the difference between principal stresses anisotropically applied in a direction parallel to a surface (principal stress difference) along the thickness direction. The principal stress difference is primitively the difference between a maximum principal stress and a minimum principal stress, which are applied to an applied surface imaginarily formed in a glass sheet (a minute surface perpendicular to a sheet surface). It is difficult to exactly measure these stresses. Assuming that in consideration of a symmetrical layout (zigzag layout) of a plurality of nozzles in FIG. 1, the principal stress in a direction parallel to the alignment of the nozzles (in the direction along the measuring line in FIG. 3) and the principal stress in a direction perpendicular to the alignment of the nozzles respectively have a maximum value or a minimum value, a membrane tensile stress is regarded as being applied to the applied surface in the case of the principal stress in the direction along the measuring line being greater, and a membrane compressive stress is regarded as being applied to the applied surface in the case of the principal stress in the direction along the measuring line being smaller.

The measurement of a membrane stress is carried out by use of a photoelastic measuring device including a light source, a laser, a polarizer and an analyzer. Specifically speaking, linearly polarized light is irradiated to one of the opposite surfaces of a glass sheet through the polarizer, and outgoing light from the other surface is observed through the analyzer. When the plane of polarization of linearly polarized light in the glass sheet changes in response to a membrane stress in the glass sheet, the brightness of outgoing polarized light from the analyzer changes. By observing a change in the brightness, it is possible to indirectly see the membrane stress.

However, the prior art stated earlier is unsatisfactory for thermally tempering an automobile glass sheet, in particular, a curved glass sheet, such as an automobile rear windowpane, wherein the thickness is not greater than 3 mm, e.g., about 2.5 mm. Additionally, there have been created problems in that it is necessary to produce blowing nozzles specialized for stress pattern formation, and that it is necessary to shorten the distance between blowing nozzles and the glass sheet.

The inventors have conducted various experiments and investigations to solve the problems in a thin automobile windowpane suited for weight reduction in the vehicle as stated earlier. The inventors have found that a glass sheet, which has been thermally tempered by air-cooling, has a region with a membrane stress in a compression state and a region with a membrane stress in a tension state alternatively formed with short distance pitches to make the glass sheet more rapidly fragmented at the moment of fragmentation of the glass sheet.

The present invention provides a tempered glass sheet, which is air-cooled and tempered by a cooling medium blown from a plurality of nozzles provided in rows so as to have a stress pattern formed therein, comprising a stress pattern formed in the glass sheet such that a plurality of cells range to form the stress pattern, the respective cells having centers just under the respective nozzles; each of the cells having a central region with a membrane stress in a compression state; each of the cells having a peripheral region with a membrane stress in a compression state; and each of the cells having a region between the central region and the peripheral region with a membrane stress in a tension state.

The present invention also provides a method for producing a tempered glass sheet comprising blowing streams of a cooling medium from a plurality of nozzles toward a heated glass sheet and utilizing impinges among streams of the cooling medium blown from adjacent nozzles to accelerate quenching of a portion of a glass sheet positioned at an intermediate location between the adjacent nozzles; and forming a stress pattern in the glass sheet such that a plurality of cells range to form the stress pattern, the respective cells having centers just under the respective nozzles, wherein each of the cells has a central region with a membrane stress in a compression state, each of the cells has a peripheral region with a membrane stress in a compression state, and each of the cells has a region between the central region and the peripheral region with a membrane stress in a tension state.

Figure 1:
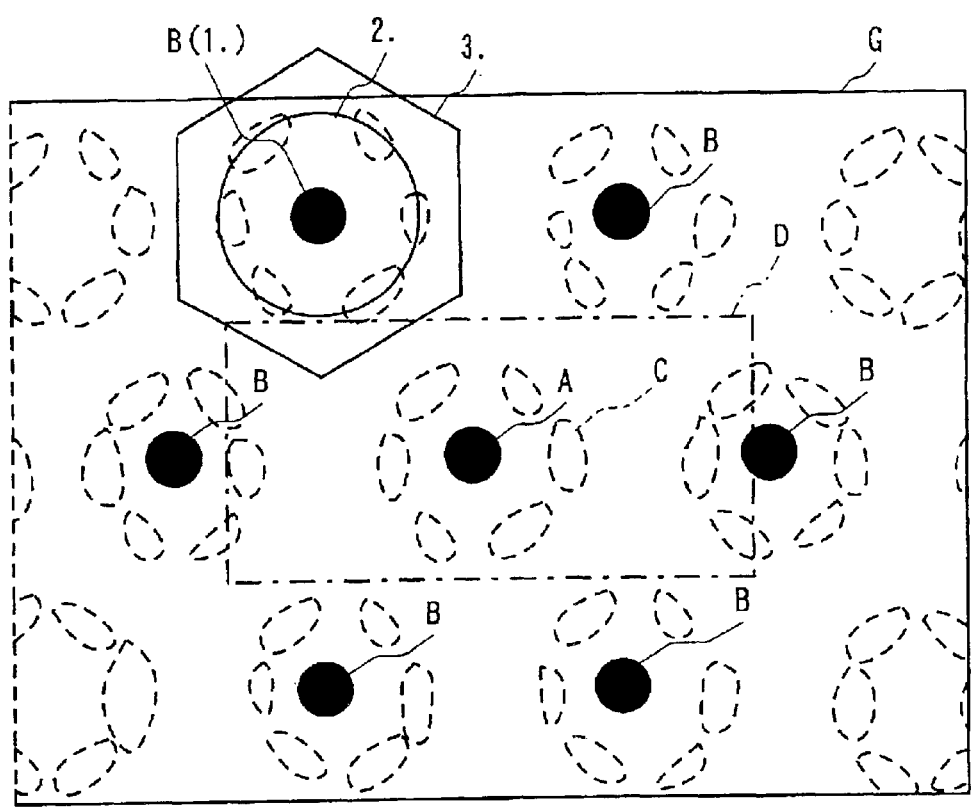
FIG. 1 is a schematic view explaining the glass sheet according to an embodiment of the present invention.

The tempered glass sheet tempered by air-cooling according to the present invention includes a stress pattern, wherein a cell is formed about a center in a portion of the glass sheet just under one of many air blowing nozzles for quenching by air-cooling, and cells are formed in portions in the glass sheet surrounding the center and positioned just under a plurality of adjacent air blowing nozzles.

The present invention is characterized in that a central portion of the cell just under the one nozzle is a compressive region (where a membrane stress is in a compression state), a peripheral portion of the cell is a compressive region, and a compressive region (where a membrane stress is in a tension state) is formed at an intermediate location between both compressive regions. The membrane compressive stresses in the compressive regions have a maximum value in a range of 4 to 12 MPa, and the membrane tensile stress in the compressive region is in a range of 4 to 12 MPa. No fragmentation acceleration effect can be expected in the case of less than 4 MPa. The formation of a stress higher than 12 MPa needs to increase a temperature difference in a narrow area, which is difficult in practice. It is preferable that the surface compressive stress in the cell ranges from 90 to 160 MPa.

Explanation of the surface compressive stress will be made. When a glass sheet at a high temperature is quenched to produce a temperature difference between the surface and the inside of the glass sheet, a tensile thermal stress is generated on the surface, and a compressive thermal stress is generated in the inside. When the glass sheet is at a temperature near to the softening point, the generated thermal stresses are relaxed in a significantly short period of time. When the glass sheet is subsequently cooled to room temperature from the mitigated state to reduce the temperature difference between the surface and the inside of the glass sheet to zero, a compressive stress and a tensile stress remain on the surface and in the inside of the glass sheet, respectively. The stress remaining in the vicinity of the surface of the glass sheet is called the surface compressive stress.

It is preferable that the pitch between locations having membrane compressive stresses in both compressive regions of one of the cells ranges from 20 to 40 mm. It is also preferable that the cells have a polygonal shape, which has an area with one side having a length ranging from 20 to 35 mm. The provision of the nozzle array having a pitch less than 20 mm is difficult in practice. In the case of a pitch beyond 40 mm, there is a danger that fragments do not satisfy the requirements prescribed in the regulations when a glass sheet is fragmented. A preferable example of the polygonal shape is a regular polygonal shape. By this arrangement, even a thin automobile windowpane suited to weight reduction of the vehicle can be rapidly fragmented at the moment of fragmentation. The glass sheet with the present invention applied thereto has a thickness of not longer than 3 mm, preferably a thickness ranging from 2.4 to 3 mm. The present invention is also applicable to a curved glass sheet, such as an automobile backlite. When the glass sheet has a thickness beyond 3 mm, it is possible to obtain fragments satisfying the requirements prescribed in the regulations at the moment of fragmentation without forming the stress pattern with a compressive region and a tensile region included therein as stated earlier.

When producing an automobile glass sheet having the characteristics stated earlier, is used a quenching system, which comprises a plurality of nozzles regularly provided with pitches having a length of about 4 times the nozzle diameter in order to alternatively form regions with a membrane compressive stress and regions with a membrane tensile stress with short pitches. The distance between the leading edge of each of the nozzles and the surface of the glass sheet to be quenched is set at a length of about 4 times the nozzle diameter.

It is known that in the case of a thermally tempered glass sheet produced by cooling air blown from array of nozzles, the locations of the glass sheet where blown air streams impinge have a membrane stress of zero, and each membrane stress is formed at a midpoint of a linear line connecting between adjacent nozzles in a direction perpendicular to the linear line as a rule. By determining the positional relationship between a glass sheet and the quenching system as stated earlier, the coefficient of convective heat transfer on a location of the glass sheet at a midpoint of a linear line connecting between adjacent nozzles can be increased, allowing regions with a membrane compressive stress and regions with a membrane tensile stress to be alternatively formed with short pitches even if the glass sheet is a small thickness and a small thermal capacity.

The mechanism of stress generation in the glass sheet thus produced is as stated below. (1) Each of the nozzle jets (cooling medium jets), which has hit a surface of the glass sheet, flows along the surface in radial fashion. (2) Each of the streams hit similar streams from adjacent nozzles. (3) Minute vortexes (turbulence) are produced at locations where the streams have hit each other (in intermediate regions between the adjacent nozzles), and the heat exchange, i.e., the quenching on the surface is accelerated to produce compressive regions. (4) The location just under each of the adjacent nozzles and the intermediate region between adjacent nozzles are cooled first, and the remaining regions are cooled later, becoming tensile regions.

Figure 2:
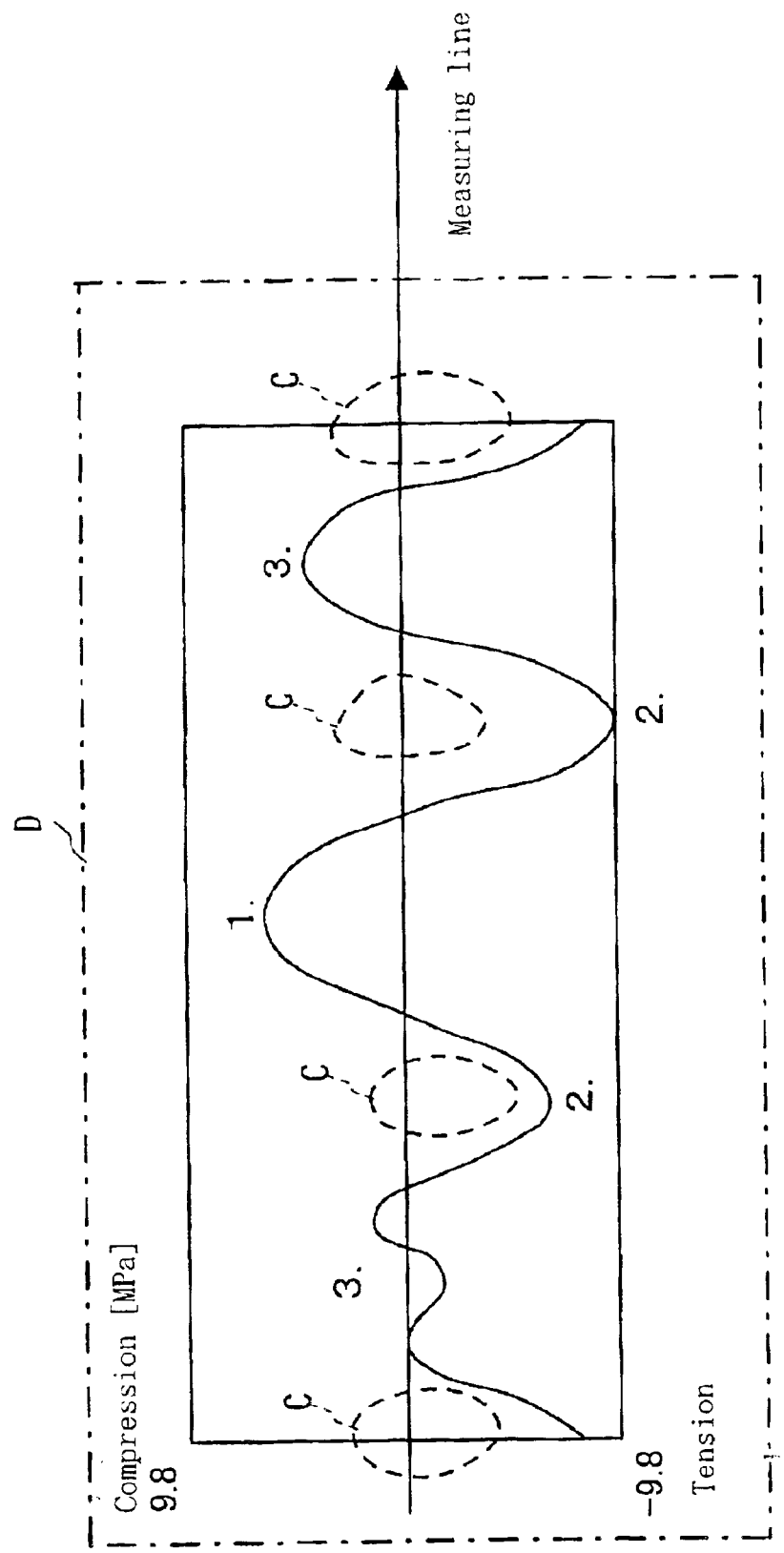
FIG. 2 is a schematic view explaining the glass sheet according to the embodiment.
Figure 3:
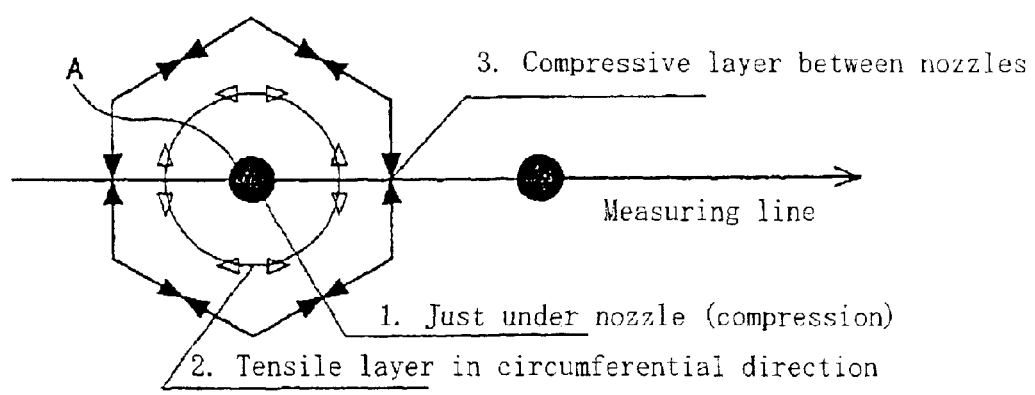
FIG. 3 is a schematic view explaining the glass sheet according to the embodiment.
Figure 4:
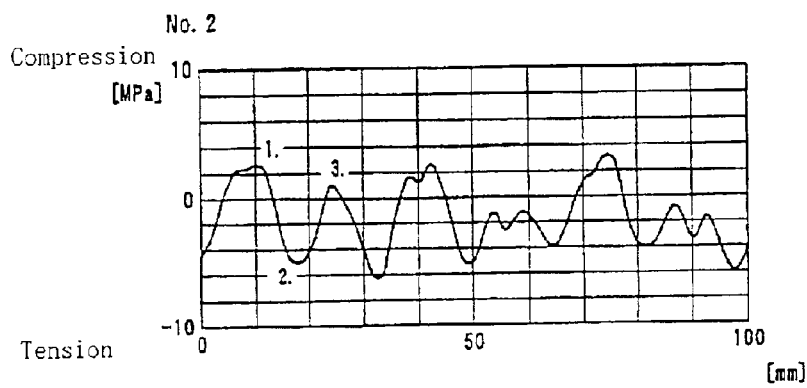
FIG. 4 is a view showing an evaluation result of an example.
Figure 5:
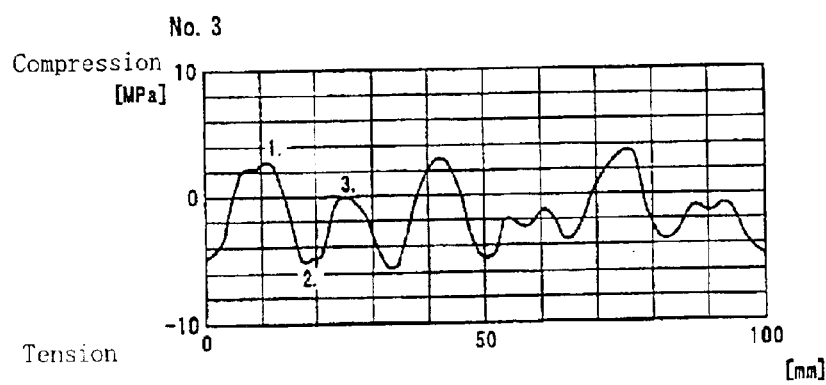
FIG. 5 is a view showing an evaluation result of an example.
Figure 6:
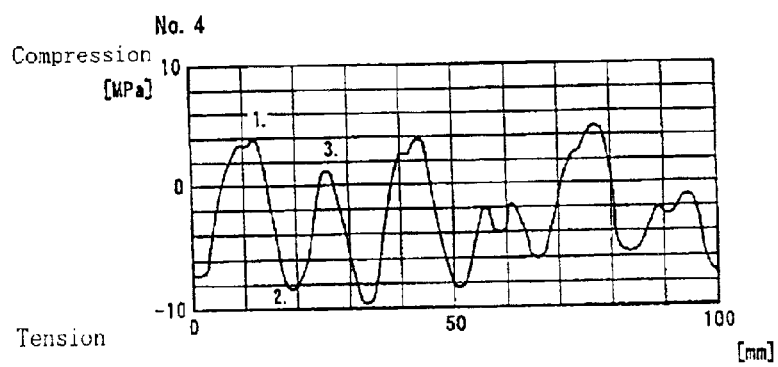
FIG. 6 is a view showing an evaluation result of an example.
Figure 7:
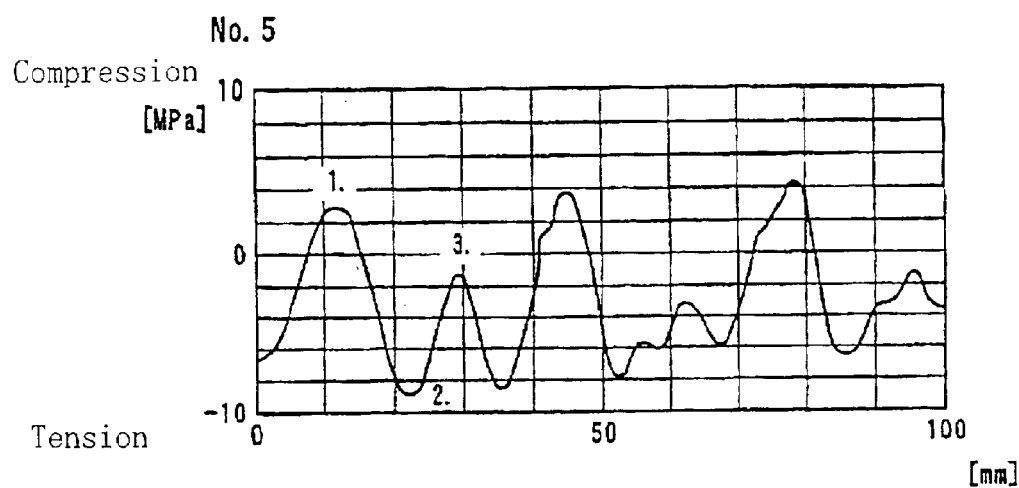
FIG. 7 is a view showing an evaluation result of an example.
Figure 8:
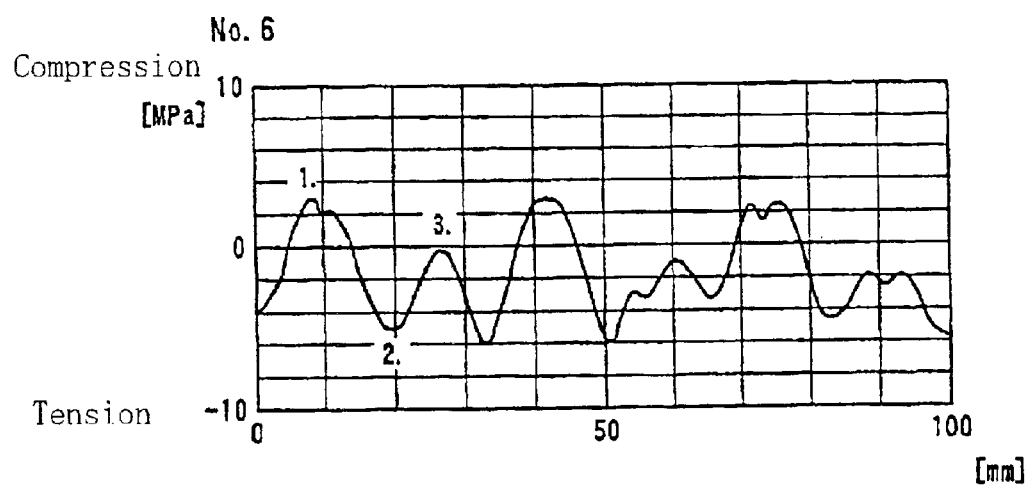
FIG. 8 is a view showing an evaluation result of an example.

FIGS. 1 to 3 are views explaining the features of the glass sheet thus produced according to an embodiment of the present invention. As shown in FIG. 1, a first array of air blowing nozzles are provided at equal intervals in a line in a lateral direction, and another array of air blowing nozzles are provided at equal intervals in a line in the lateral direction at each of upper and lower locations equally spaced from the first array of air blowing nozzles so as to be offset by a length of about a half interval with respect to the first array of air blowing nozzles. Three adjacent nozzles thus provided form an equilateral triangle, and six adjacent nozzles located about one nozzle form a regular polygon.

When only two arrays of the nozzles provided at equal intervals in an upper or lower direction or in a right or left direction are observed, the respective nozzles are provided with regular intervals in zigzag fashion in the right or left direction and the upper or lower direction.

FIG. 2 is an enlarged view showing a rectangular portion indicated as a region D in FIG. 1, wherein measurements with respect to membrane stresses are shown. FIG. 2 shows actually measured values with respect to membrane compressive stresses and membrane tensile stresses along a measuring line, i.e., the line of a nozzle array (the first array of nozzles) in the lateral direction. FIGS. 1 and 2 show that a compressive stress is produced just under each of the air blowing nozzles, and tensile stresses and a compressive stress are alternatively produced between adjacent nozzles with respect to the generation of membrane stresses.

Specifically speaking, a central portion on the line shown as the measuring line in FIG. 2, i.e., the location indicated by reference "1." corresponds to the position just under a nozzle. The location "1." has a compressive stress of 57 kgf/cm$^2$ ($\approx$5.586 MPa). The location indicated by reference "2." on the left has a tensile stress of 64 kgf/cm$^2$ ($\approx$6.272 MPa). The location indicated by reference "2." on the right has a tensile stress of 100 kgf/cm$^2$ ($\approx$9.80 MPa). Observing a right-hand side of the location "2." on the right, the location indicated by reference "3." has a compressive stress of 44 kgf/cm$^2$ ($\approx$4.312 MPa). It is shown that although the location indicated by reference "3." on the left has a small compressive stress, the stresses along the measuring line are formed such that a compressive stress is produced just under each of the nozzles, and tensile stresses and a compressive stress are alternatively produced in the right and left directions.

The explanation stated just above is directed to the stresses that are produced among nozzles provided in a line. Around the location just under a nozzle (hereinbelow, referred to as the nozzle A), there are locations just under 6 nozzles (hereinbelow, referred to as the nozzles B) about the nozzle A. The observation on that area on a principal surface of a glass sheet G in terms of the mechanism of stress generation referred to as (1) to (4) is follows:

(1) The nozzle jet from the nozzle A and the nozzle jets from the 6 adjacent nozzles B impinge the principal surface of the glass sheet G, and the respective nozzle jets flow on the surface of the glass sheet G in radial fashion.

(2) The air stream from the nozzle A hits similar air streams from the 6 adjacent nozzles B.

(3) Minute vortexes are produced at locations where the stream from the nozzle A has hit the respective streams from the 6 adjacent nozzles B, and consequently cooling the surface of the glass sheet G is accelerated.

(4) Thus, the locations just under the nozzles A and B, and the locations where the streams from the respective nozzles have hit each other are cooled first, and the remaining portions are cooled later, becoming tensile layers (regions C).

FIG. 3 is a view showing the relationship of membrane compressive stresses and membrane tensile stresses with respect to the contents of items (1) to (4), i.e., the regular polygonal portion just under the one nozzle (nozzle A) in an upper left portion in FIG. 1. FIG. 3 also shows the location just under the nozzle on the right of the nozzle A. There are 6 locations just under 6 nozzles, including the nozzle on the right of the nozzle A, about the nozzle A. In the location of the glass sheet just under the nozzle A, a membrane compressive stress is produced since that location is cooled relatively rapidly than surrounding areas.

Since a nozzle jet flows among the nozzle jets from 6 adjacent nozzles, hard cooling and weak cooling are provided accordingly. As a result, membrane tensile stresses are produced in locations subjected to the weak cooling in radial fashion so as to surround the location just under the central nozzle. In FIG. 3, the locations with the membrane tensile stresses produced therein are portions indicated as a circumferential tensile region (tensile layer in a circumferential direction). Membrane compressive stresses are produced in locations subjected to the hard cooling in radial fashion so as to surround the tensile region, i.e., the locations with the membrane tensile stresses produced therein. In FIG. 3, the locations with the membrane compressive stresses produced therein are portions indicated as a compressive region between nozzles (compressive layer between nozzles).

EXAMPLES

Now, the present invention will be described in detail in reference to examples. It should be noted that the present invention is not limited to the examples. In the examples, glass sheets having a thickness of 2.5 mm were utilized to produce tempered glass sheets by carrying out a quenching treatment under the following conditions.

The specifications of the quenching system were as stated below. The system was provided with an upper air outlet and a lower air outlet above and under a glass sheet in order to quench both surfaces of the glass sheet. Each of the air outlets had many nozzles having an inner diameter of 7.5 mm formed at pitches of 33 mm therein. The nozzles were provided such that every set of three adjacent nozzles forms an equilateral triangle. The blown air pressure was set at 20 kPa, and the distance between the leading edge of each of the nozzles and the surface of a glass sheet was set at 30 mm. The quenching treatment was carried out with a glass sheet being slid in a surface direction of the glass sheet after the glass sheet was put in a stationary state for 3 seconds since commencement of the quenching treatment. The glass sheets thus produced had the stress values as follows: a membrane tensile stress=10 MPa, a membrane compressive stress=10 MPa, stress pitches on the line (i.e. pitch between a location with a maximum membrane compressive stress and an adjacent location with a maximum membrane compressive stress)=33 mm, the size of a cell formed by the membrane stress distribution=a regular polygonal having a side of 27.5 mm, and a surface compressive stress=97 to 147 MPa. The ratio of the distance between a nozzle and each of the glass sheets to the inner diameter of the nozzle was about 4. Tables 1 and 2 show the evaluation results of test samples Nos. 2 to 6, wherein Table 1 shows membrane stresses in the surfaces of the glass sheets and Table 2 shows surface compressive stresses.

TABLE 1

Membrane stress (in the surface)

| | | | Membrane stress (+: compression, − tension) | |
|---|---|---|---|---|
| No. | QS (−) | Air pressure at upper outlet/air pressure at lower outlet (kPa) | 1. Just under nozzle (MPa) | 2. Intermediate region in cell (MPa) | 3. Intermediate location between adjacent nozzles (MPa) |
| No. 2 | 0.6 | 22.54/22.54 | 2.3 | −5.2 | 1.1 |
| No. 3 | 0.6 | 22.05/21.07 | 3.0 | −5.0 | 0.4 |
| No. 4 | 3.0 | 22.05/21.07 | 4.5 | −8.7 | 1.5 |
| No. 5 | 3.0 | 19.6/19.6 | 3.2 | −9.2 | −1.0 |
| No. 6 | 0.6 | 19.6/19.6 | 3.0 | −5.5 | 0.1 |

TABLE 2

| | | Air pressure at upper outlet/air pressure at lower outlet (kPa) | Surface compressive stress (in the surface) | | | |
|---|---|---|---|---|---|---|
| | | | 1. Just under nozzle (MPa) | | 3. Intermediate location between adjacent nozzles (MPa) | |
| No. | QS (−) | | Vertical direction | Transverse direction | Vertical direction | Transverse direction |
| No. 2 | 0.6 | 22.54/22.54 | 134 | 129 | 129 | 127 |
| No. 3 | 0.6 | 22.05/21.07 | 145 | 139 | 134 | 129 |
| No. 4 | 3.0 | 22.05/21.07 | 169 | 163 | 156 | 153 |
| No. 5 | 3.0 | 19.6/19.6 | 129 | 129 | 127 | 127 |
| No. 6 | 0.6 | 19.6/19.6 | 127 | 129 | 118 | 108 |

FIGS. 4–8 are views (graphs) showing the evaluation results of the test samples. QS in the Tables is an abbreviation of "Quench Stop", which indicates the standby time that was taken since the placement of a glass sheet just below the nozzles until the commencement of sliding movement. Although a glass sheet is usually slid to be uniformly cooled in the quenching treatment, the present invention keeps a glass sheet stationary as long as possible in order that the stress pattern reflects the array of nozzles.

In the graphs, reference numeral 1. designates the compressive region just under a nozzle, reference numeral 2. designates a tensile region in a circumferential direction, and reference numeral 3. designates the compress region that is located right in the middle between adjacent nozzles. In each of the graphs, the vertical line and the horizontal axis indicate membrane stresses and locations along the measuring line of FIG. 3, respectively. QS is indicated as relative values.

In accordance with the present invention, a tempered glass sheet, which is tempered by air-cooling, in particular a glass sheet, which has a small thickness suited for weight reduction in the vehicle, can be fragmented more rapidly at the moment of fragmentation of the glass sheet, without losing a sufficient strength. The present invention is also applicable to thermally temper an automobile glass sheet having a thickness of not greater than 3 mm, for example about 2.5 mm, in particular a curved glass sheet, such as an automobile rear windowpane, which have been difficult to be thermally tempered. The present invention is applicable to a windowpane for ships, aircrafts, buildings and others in addition to vehicles other than automobiles.

The entire disclosure of Japanese Patent Application No. 2001-133719 filed on Apr. 27, 2001 including specification, claims, drawings and summary are incorporated herein by reference in its entirety.

What is claimed is:

1. A tempered glass sheet, which is air-cooled and tempered by a cooling medium blown from a plurality of nozzles provided in rows so as to have a stress pattern formed therein, comprising:
    a stress pattern formed in the glass sheet such that a plurality of cells range to form the stress pattern, the respective cells having centers just under the respective nozzles;
    each of the cells having a central region with a membrane stress in a compression state;
    each of the cells having a peripheral region with a membrane stress in a compression state; and
    each of the cells having a region between the central region and the peripheral region with a membrane stress in a tension state.

2. The tempered glass sheet according to claim 1, wherein a distance between a location having a maximum membrane compressive stress in the central region and a location having a maximum membrane compressive stress in the peripheral region in each of the cells ranges from 20 to 40 mm.

3. The tempered glass sheet according to claim 1, wherein:
    the membrane compressive stresses in the central region and the peripheral region in each of the cells have a maximum value ranging from 4 to 12 MPa, respectively; and
    the membrane tension stresses in the region between the central region and the peripheral region in each of the cells have a maximum value ranging from 4 to 12 MPa, respectively.

4. The tempered glass sheet according to claim 1, wherein the cells have a polygonal shape, which has one side having a length ranging from 20 to 35 mm.

5. The tempered glass sheet according to claim 1, wherein the sheet has a thickness of not greater than 3 mm.

6. The tempered glass sheet according to claim 1, wherein the sheet has a thickness ranging from 2.4 to 3 mm.

7. The tempered glass sheet according to claim 1, wherein the stress pattern has a surface compressive stress ranging from 90 to 160 MPa.

8. The tempered glass sheet according to claim 1, wherein the sheet is utilized as an automobile windowpane.

9. A method for producing a tempered glass sheet comprising:
    blowing streams of a cooling medium from a plurality of nozzles toward a heated tempered glass sheet and utilizing hits among streams of the cooling medium blown from adjacent nozzles to accelerate quenching of a portion of a glass sheet positioned at an intermediate location between the adjacent nozzles; and
    forming a stress pattern in the glass sheet such that a plurality of cells range to form the stress pattern, the respective cells have centers just under the respective nozzles, wherein each of the cells has a central region with a membrane stress in a compression state, each of the cells has a peripheral region with a membrane stress in a compression state, and each of the cells has a region between the central region and the peripheral region with a membrane stress in a tension state.

10. The method according to claim 9, wherein a distance between a location having a maximum membrane compressive stress in the central region and a location having a maximum membrane compressive stress in the peripheral region in each of the cells ranges from 20 to 40 mm.

11. The method according to claim 9, wherein:
    the membrane compressive stresses in the central region and the peripheral region in each of the cells have a maximum value ranging from 4 to 12 MPa, respectively; and
    the membrane tension stresses in the region between the central region and the peripheral region in each of the cells have a maximum value ranging from 4 to 12 MPa, respectively.

12. The method according to claim 9, wherein the cells have a polygonal shape, which has one side having a length ranging from 20 to 35 mm.

13. The method according to claim 9, wherein the sheet has a thickness of not greater than 3 mm.

14. The method according to claim 9, wherein the sheet has a thickness ranging from 2.4 to 3 mm.

15. The method according to claim 9, wherein the stress pattern has a surface compressive stress ranging from 90 to 160 MPa.

16. The method according to claim 9, wherein the sheet is utilized as an automobile windowpane.

\* \* \* \* \*